United States Patent [15] 3,675,219
Kawasaki et al. [45] July 4, 1972

[54] DYNAMIC MEMORY SYSTEM HAVING SIGNAL HOLDING DEVICE

[72] Inventors: Jun Kawasaki, Kodaira; Hiroshi Uehara, Kokubunji, both of Japan

[73] Assignee: Hitachi, Ltd., Tokyo, Japan

[22] Filed: June 22, 1970

[21] Appl. No.: 48,446

Related U.S. Application Data

[63] Continuation of Ser. No. 639,549, May 18, 1967, abandoned.

[30] Foreign Application Priority Data

May 18, 1966 Japan....................................41/31170
May 18, 1966 Japan....................................41/31171

[52] U.S. Cl.....................340/173 RC, 340/173 FF, 307/224, 307/238
[51] Int. Cl.....................G11c 19/00
[58] Field of Search................340/173 RC, 173 FF, 173 MS; 307/221, 222, 223, 224

[56] References Cited

UNITED STATES PATENTS

| | | | |
|---|---|---|---|
| 3,231,867 | 1/1966 | Bartlett | 340/173 |
| 3,274,566 | 9/1966 | McGrogan | 340/173 |
| 3,275,993 | 9/1966 | Bartlett | 340/173 |

*Primary Examiner*—Terrell W. Fears
*Attorney*—Craig, Antonelli and Hill

[57] ABSTRACT

A dynamic memory system wherein a continuously recirculating delay loop includes a plurality of read-out stations and a plurality of gating circuits are provided to selectively connect a plurality of corresponding signal holding circuits to said read-out stations at periodic times of the recirculating cycle, each holding circuit comprising an amplifying insulated gate field effect transistor and storage capacitance means formed by the interelectrode capacitance of said field effect transistor.

20 Claims, 10 Drawing Figures

DYNAMIC MEMORY SYSTEM HAVING SIGNAL HOLDING DEVICE

This application is a continuation of our application Ser. No. 639,549, filed May 18, 1967 and now abandoned.

DETAILED EXPLANATION OF THE INVENTION

The present invention relates to an improved shift register which has both static and dynamic capabilities.

Dynamic memories such as a dynamic shift register or delay line possess the advantages of low cost and high speed operation compared with static registers. However, because the memory contents of the dynamic memory are held therein by being circulatorily moved, a special display device having a memory or persistance capability, such as a cathode ray tube have hitherto been used in conjunction with such dynamic memories. Further, a highly specialized technical competence is needed for manufacture said display device employing a cathode ray tube and, in addition, such display devices are expensive.

Static registers have been used in combination with a dynamic memory and, by doing so, the memory contents of said dynamic memory are stored in said static register. With such an arrangement, a display lamp associated with the output end of the static register can be used to effectuate display on the lamp, or the signal from said output end can be used for arithmetic processing. Known arrangements of this type employing a static register, however, are slow in operation and need many elements per bit. For this reason, it is difficult to incorporate integrated circuits (hereinafter referred to as IC) into such known static register arrangements. This constitutes a considerable difficulty where the electronic computer equipment associated with such a static register arrangement is of such a nature that it is to be constituted of IC construction.

Additionally, where the conventional dynamic memory is combined with a static register, there is the disadvantageous point that when a signal is once readout from the dynamic memory to the static register and if the memory contents are thereafter changed, the changed memory contents will not appear on the static register. In other words, the memory contents in the dynamic memory do not always directly correspond to the display of the static register.

A principal object of this invention is to provide a signal holding device of simple construction in which the circulatorily moving memory contents of a dynamic memory can be statically held.

Another object of this invention is to provide a dynamic memory having the above characteristics in which a new static signal holding circuit is provided and it is possible for the memory contents which are statically held to be changed in prompt response to varying circulatorily moving memory contents.

Another object of this invention is to provide a shift register of markedly low cost and small size, and in which field effect transistor(s) (hereinafter called FET's) are used to form the static signal holding elements and, by thus arranging the circuit, it is possible to incorporate IC manufacturing techniques in fabricating the signal holding elements.

Still another object of this invention is to make it possible to provide an electronic computer of markedly low cost and small size by constituting the shift register of a relatively small number of FET's and thus facilitate the use of IC in manufacture of the overall computer circuit.

Various further and more specific objects, features and advantages of the invention will appear from the description given below, when taken in connection with accompanying drawings which illustrate by way of example certain preferred embodiments of this invention.

BRIEF EXPLANATION OF THE DRAWINGS

Referring now to FIGS. 1 through 3 inclusive, the prior art will be described below.

In FIG. 1, a conventionally known dynamic memory 1 comprises a delay circuit 3 such as a delay line or temporary memory element connected in a cascade arrangement. Digital signals which are to become memory contents are circulated in said dynamic memory 1 and are held therein. On the other hand, the memory contents are supplied in succession to a static register 2 which possesses a number of register elements 4 connected in cascade and corresponding in number to the number of the bits of the memory content. With this arrangement, the memory content is held by the respective register elements 4. Display devices (not shown by figure) such as lamps may be provided corresponding in number to the respective register elements 4 and the memory contents may be used for further operation.

FIG. 2 is a circuit diagram showing the construction of a conventionally known dynamic shift register. The circuit of the dynamic shift register of FIG. 2 is not constituted by the use of resistance elements, capacitance elements, or the like, but by establishing a cascade connection with insulated gate type FET's. Therefore IC can be utilized in the manufacture of the circuit. Also, it can be said that the circuit is quite satisfactory in many respects. More specifically, the operation of the circuit shown in FIG. 2 is as follows.

When an input signal coming into a gate terminal $g_{41}$ of FET-$M_{41}$ is of negative potential (i.e. signal "1"), FET-$M_{41}$ becomes conducting and a drain terminal $d_{41}$ of FET-$M_{41}$ assumes earth potential (OV). In this instant if a first clock pulse $CP_1$ is applied to the gate $g_{42}$ of the FET-$M_{42}$, it becomes conductive and the potential of a gate terminal $g_{44}$ of FET-$M_{44}$ is made nearly zero. In this instant of time, FET-$M_{43}$ acts as a load of FET-$M_{41}$ and also becomes conductive. However the resistance under conductive conditions of FET-$M_{43}$ is designed to be large enough in comparison with that of FET-$M_{41}$. Therefore the potential at the point $d_{41}$ is maintained nearly zero volt. This potential at $d_{41}$ is held even when the clock pulse $CP_1$ is cleared and FET-$M_{42}$ becomes non-conductive and further, the point $d_{41}$ is electrically disconnected from the point $g_{44}$.

Figure 2:
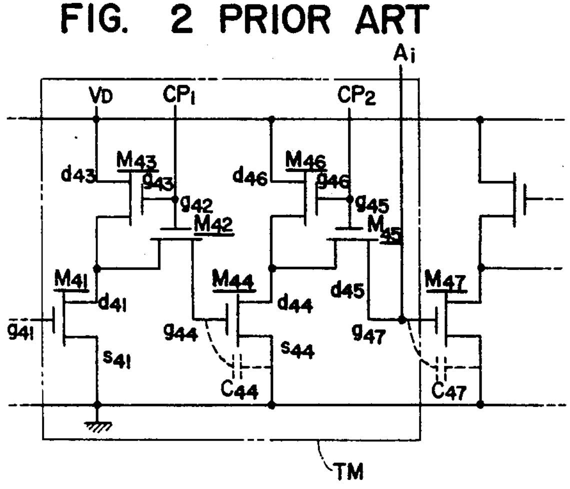
FIG. 2 PRIOR ART
FIG. 2 is a partial circuit diagram showing the construction of one known form of the dynamic memory portion of the circuit shown in FIG. 1.

This is due to as shown by the dotted lines in FIG. 2, a capacitance $C_{44}$ between the gate terminal $g_{44}$ of FET-$M_{44}$ and the source terminal $s_{44}$ which is grounded. As a result, the signal is held and the potential on the gate terminal $g_{44}$ is maintained at zero volts. Therefore FET-$M_{44}$ becomes non-conductive and, because a negative source $V_D$ is applied thereto via FET-$M_{48}$ which is associated therewith as a load, the potential on the point $d_{44}$ is maintained at nearly $V_D$. When a second clock pulse $CP_2$ is applied a half cycle behind the repeating cycle of the first clock pulse $CP_1$, FET-$M_{45}$ becomes conductive and the potential on the gate terminal $g_{47}$ of FET-$M_{47}$ becomes nearly equal to said potential $V_D$ on said point $d_{44}$. Even when the second clock pulse $CP_2$ is cleared and FET-$M_{45}$ becomes non-conductive, the signal is held by a capacitance $C_{47}$ between the gate and source of FET-$M_{47}$ in the same manner as the said FET-$M_{44}$. The input signal applied to the point $g_{41}$ thus is shifted by the clock pulses $CP_1$ and $CP_2$ in a manner such that a one bit shift signal is obtained at the output terminal Ai.

Figure 1:
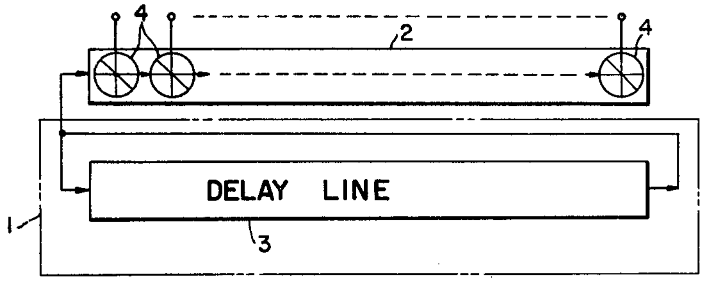
FIG. 1 PRIOR ART
FIG. 1 is a functional block diagram showing a known method of splay in which a memory content of the conventional dynamic memory is shifted to a static register.
Figure 3:
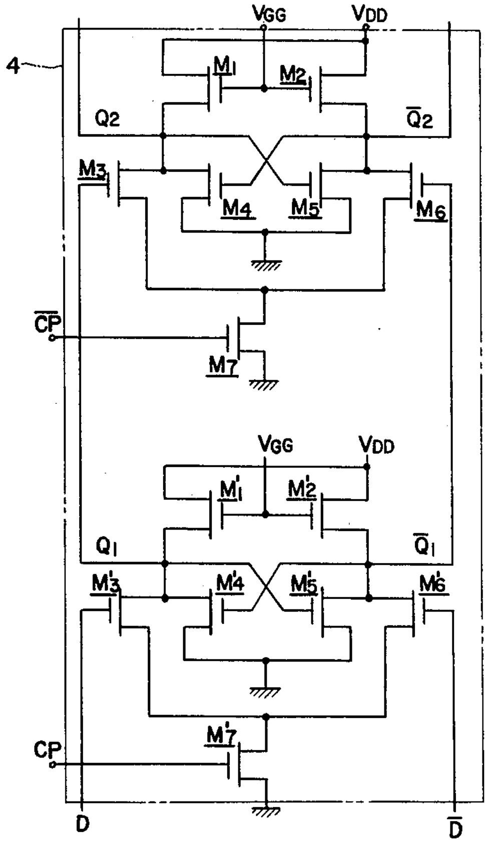
FIG. 3 PRIOR ART
FIG. 3 is a partial circuit diagram showing an example of a known form of the static register portion of the circuit shown in FIG. 1.

FIG. 3 is a circuit diagram showing the details of one of the register elements 4 for 1 bit of the static register 2 as in FIG. 1, and is constituted of FET-$M_1$ through FET-$M_7$ and FET-$M'_1$ through FET-$M'_7$. The operation of said circuit is such that when a clock pulse CP comes in the gate terminal of FET-$M'_7$, FET-$M'_7$ becomes conductive and the output signal D of the delay circuit 3 and its inverse signal D, signals which are applied respectively to the gate terminals of FET-$M'_3$ and FET-$M'_6$, are held by a bistable circuit comprising FET-$M'_4$ and FET-$M'_5$.

When a dynamic shift register as shown in FIG. 2 is used as the delay circuit of FIG. 1 a voltage at the point *Ai* is used as the signal D and an inverse voltage of the point *Ai* is used as the signal D. FET-$M'_1$ and FET-$M'_2$ are biased by a DC voltage source VGG which is applied to the gate terminal common to said FET-$M'_1$ and FET-$M'_2$ and further, said FET-$M'_1$ and FET-$M'_2$ are operated as load circuits of FET-$M'_4$ and FET-$M'_5$, to supply a DC voltage source VDD to the drain terminals of FET-$M'_4$ and FET-$M'_5$. A signal $Q_1$ held at the dual stable circuit which comprises FET-$M'_4$ and FET-$'_5$ and its inverted signal $Q_1$ becomes the input signal of FET group $M_1$ through $M_7$ inclusive composed exactly in the same manner as FET group $M'_1$ through $M'_7$ inclusive. When the clock pulse CP is cleared, its inverted pulse CP is applied to the gate terminal of FET-$M_7$ and, therefore, said signals $Q_1$ and $Q_1$ are held at the bistable circuit comprised by FET-$M_4$ and FET-$M_5$. In the conventional static register as in FIG. 1, the number of the register elements 4 provided are equal to that of the bits of the memory contents. As the result, many register elements 4 becomes necessary and, in addition, if each register element 4 is constituted by FET's in the manner as described above, then the register element 4 for use in each bit state should be provided with both the FET group which are to receive signals from the prior bit stage and with the FET group which are to hold signals for the purpose of sending said signal to the register element of the next bit state. For this reason the number of FET elements per bit of static register element 4 could be as many as 14 and, consequently, the memory becomes costly and it is made difficult to incorporate into an IC structure. Further, in the conventional example as described above, if the memory contents circulating in the dynamic memory are once readout and, if said circulating memory contents are changed after they are read into the static shift register, the signal in the static register remains unchanged.

The present invention has one of its principal features in the structure in which said disadvantages of the conventional shift register as discussed above are overcome and a new shift register is constituted by combining a simple static signal holding circuit and a dynamic memory.

Figure 4:
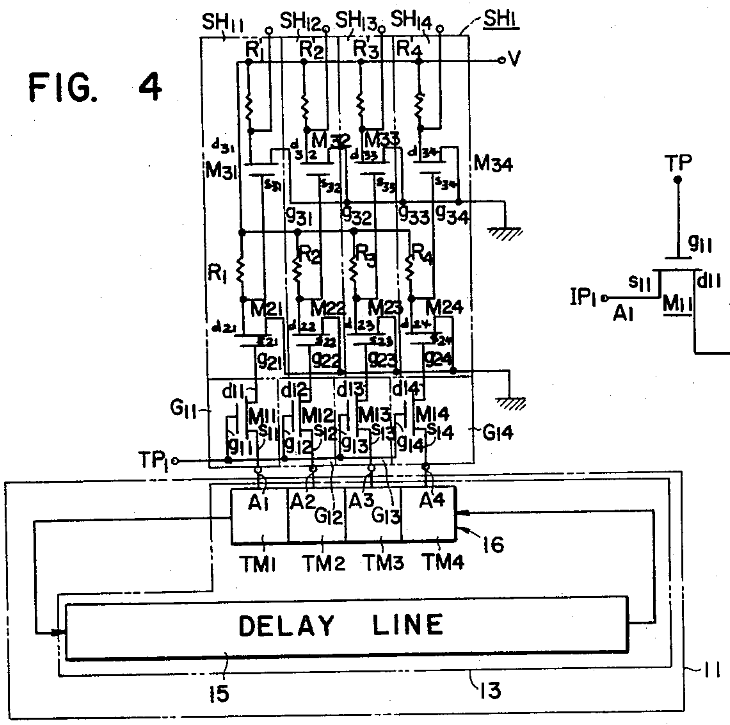
FIG. 4 is a schematic diagram of an embodiment of this invention, illustrating a circulating shift register which is provided with a static signal holding circuit.

FIG. 4 is a partial schematic diagram illustrating an embodiment of this invention and more particularly a diagram showing a shift register in which binary-coded decimal signal, i.e. decimal digit is expressed by binary 4 bit signals is stored as a memory content. The numeral 11 designates a dynamic memory comprising a dynamic delay device 13 which is equivalent to the delay circuit 3 shown in FIG. 1. Said dynamic memory is constructed so as to hold certain desired numbers of binary coded-decimal signals of four bits by circulating the same therein. Said delay device 13 comprises a unit delay circuit 16 which has four output terminals $A_1 - A_4$ from which four bits of the signal output are derived, and which operates as a delay for the four bits thus derived, and also comprises a delay circuit 15 which gives a delay for the desired number of signal bits to be stored.

This embodiment can be best described by referring to an example of a dynamic shift register such as the structure having a cascade connection of four temporary memory circuits TM, as in FIG. 2 which functions as the unit delay circuit 16. Further, for better understanding of this embodiment, another delay circuit 15 is separately described. It is to be noted, however, that said delay circuit 15 may be constituted by said temporary memory circuit TM and these two circuits may be combined into one.

In this embodiment, one signal holding device $SH_1$ having four gate circuits connected to four corresponding output terminals of said unit delay circuit and, four signal holding circuits connected in correspondence to said gate circuits to cooperate with one unit delay circuit 16 are provided. $G_{11}$ through $G_{14}$ inclusive represent gate circuits for FET-$M_{11}$ through FET-$M_{14}$ inclusive. Said FET-$M_{11}$ through FET-$M_{14}$ respectively are comprised by sources $s_{11}$ through $s_{14}$, gates $g_{11}$ through $g_{14}$ and drains $d_{11}$ through $d_{14}$. Said sources $s_{11}$ through $s_{14}$ respectively are connected to output terminals $A_1$ through $A_4$ of temporary memory circuits $TM_1$ through $TM_4$ connected in cascade in the dynamic shift register 16. At the instant when binary-coded decimal signals of four bits appear at the output terminal of each of the temporary memory circuits $TM_1$ through $TM_4$ of said dynamic shift register 16 timing pulses $TP_1$ are instantaneously applied in parallel to the gates $g_{11}$ through $g_{14}$ inclusive. By this arrangement, the gate circuits $G_{11}$ through $G_{14}$ inclusive are simultaneously made conductive by the said timing pulses $TP_1$ for the period of their holding time, and the binary-coded decimal signals of four bits appear at drains $d_{11}$ through $d_{14}$ inclusive. Signal holding circuits $SH_{11}$ through $SH_{14}$ inclusive are respectively connected with the gate circuits $G_{11}$ through $G_{14}$.

$SH_1$ is a signal holding device which includes said gate circuits $G_{11}$ through $G_{14}$ and said signal holding circuits $SH_{11}$ through $SH_{14}$ consisting of FET-$M_{21}$ through FET-$M_{24}$ and FET-$M_{31}$ through FET-$M_{34}$ inclusive. The gate terminals $g_{21}$ through $g_{24}$ of said FET-$M_{21}$ through FET-$M_{24}$ are respectively connected to said drains $d_{11}$ through $d_{14}$ of FET-$M_{11}$ through FET-$M_{14}$, and said gate terminals $g_{21}$ through $g_{24}$ receive four bits of binary-coded decimal signals from drains $d_{11}$ through $d_{14}$. The drains $d_{21}$ through $d_{24}$ inclusive of FET-$M_{21}$ through FET-$M_{24}$ are respectively connected to the gates $g_{31}$ through $g_{34}$ of FET-$M_{31}$ through FET-$M_{34}$. V is a terminal of a DC voltage source (not shown by figure) from which a DC voltage is supplied to the drains $d_{21}$ through $d_{24}$ of FET-$M_{21}$ through FET-$M_{24}$ inclusive, via resistors $R_1$ through $R_4$ and also to the drains $d_{31}$ through $d_{34}$ of FET-M $_{31}$ through FET-$M_{34}$, via resistors $R'_1$ through $R'_4$. The sources $s_{21}$ through $s_{24}$ and $s_{31}$ through $s_{34}$ of FET-$M_{21}$ through FET-$M_{24}$ and FET-$M_{31}$ through FET-$M_{34}$ are connected to the other end of said DC voltage source, via grounding.

Figure 5:
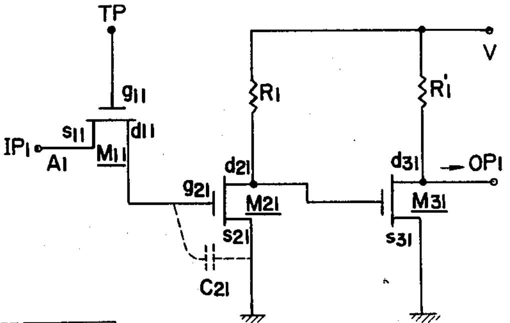
FIG. 5 is a detailed circuit diagram showing the construction of the signal holding circuit for one bit, employed with respect to the embodiment shown in FIG. 4.
Figure 6:
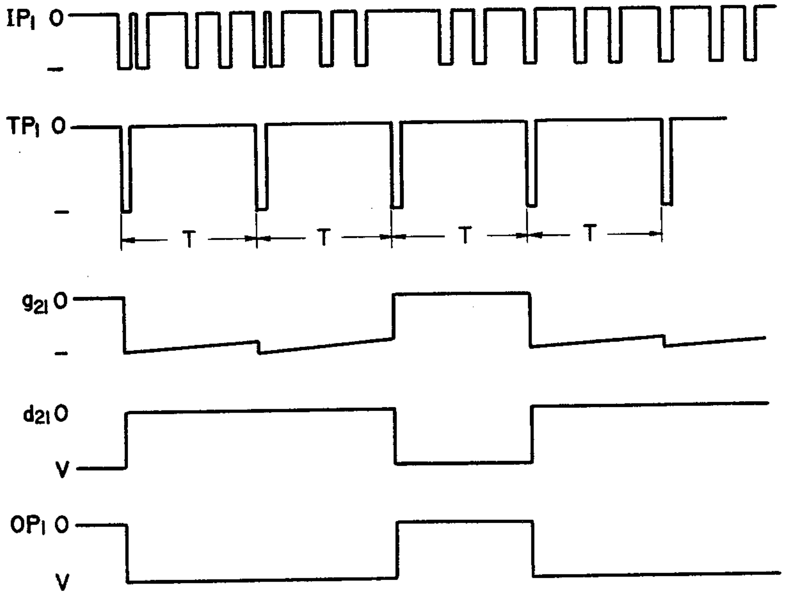
FIG. 6 is a series of waveforms showing the operation of the signal holding circuit of FIG. 5.

FIG. 5 illustrates better the construction of said gate circuit $G_{11}$ and signal holding circuit $SH_{11}$ of one bit of the signal holding device $SH_1$ shown in FIG. 4. The operation of this embodiment will be described by referring to FIGS. 5 and 6. To the source $s_{11}$ of FET-$M_{11}$ constituting the gate circuit $G_{11}$, a signal (for example, a signal shown by $IP_1$ as in FIG. 6) which is being circulated in said dynamic memory 11 is supplied as an input signal from said output terminal $A_1$ of the temporary memory circuit $TM_1$ of said dynamic shift register 16. When the timing pulse $TP_1$ is applied instantaneously and is of negative potential; i.e. the state of signal "1" the insulating gate type FET-$M_{11}$ becomes conductive and the input signal IP (negative in this instance) is delivered through the drain $d_{11}$ to the gate $g_{21}$ of the insulating gate type FET-$M_{21}$. And, when said timing pulse $TP_1$ becomes zero potential i.e. the state of signal "0", the resistance between the source and drain of said FET-$M_{11}$ become several hundred megohms and the input signal is cut-off. Therefore, because the resistance between the gate and source of FET-$M_{21}$ is about $10^{12}$ Ω, the input signal $IP_1$ is held as an electric charge by the storage capacitance $C_{21}$ between the gate and source of said FET-$M_{21}$. This electric charge is held for a period of time which is determined by a time constant of said capacitance $C_{21}$ between the gate and source of FET-$M_{21}$ and the resistance between the source and drain of the FET-$M_{11}$. In view of the foregoing, a time constant is set so that the memory contents of said dynamic type shift register may make a circulation within a period of said time and that a cycle T of said timing pulse may be fixed to be a cycle $T_o$ for which a signal of the dynamic memory 11 makes one round of circulation. Thus, the signal stores in between the gate and source of said FET-$M_{21}$ is held for a period T equal to a period $T_o$ of one round of circulation of the contents of the dynamic register 11. According to the present invention as described, a signal holding circuit can be constituted by a small number of FET's and, by sending out a timing pulse at every circulation cycle $T_o$ of the circulated memory contents, a signal of a constantly determined part of said memory contents is held by a predetermined portion of the signal holding device. As a result, the signal contents of the static signal holding circuits can be shifted or changed during each circulation cycle $T_o$ of the dynamic register. The signal held at the point $g_{21}$ is inversely reshaped as a potential of the drain $d_{21}$ of FET-$M_{21}$ and further inverted at FET-$M_{31}$. Therefore a signal $OP_1$ which has been reshaped and amplified from the signal held at the gate $g_{21}$ of said FET-$M_{21}$ is obtained at the drain $d_{31}$ of said FET-$M_{31}$. It is obvious that the resistance elements $R_1$ and $R'_1$ of this circuit may be constituted by the use of suitably biased FET's.

The memory contents of said dynamic memory can be visually displayed when a display device such as a lamp is turned on and off by means of output signals from the output terminal $OP_1$.

Figure 7A:
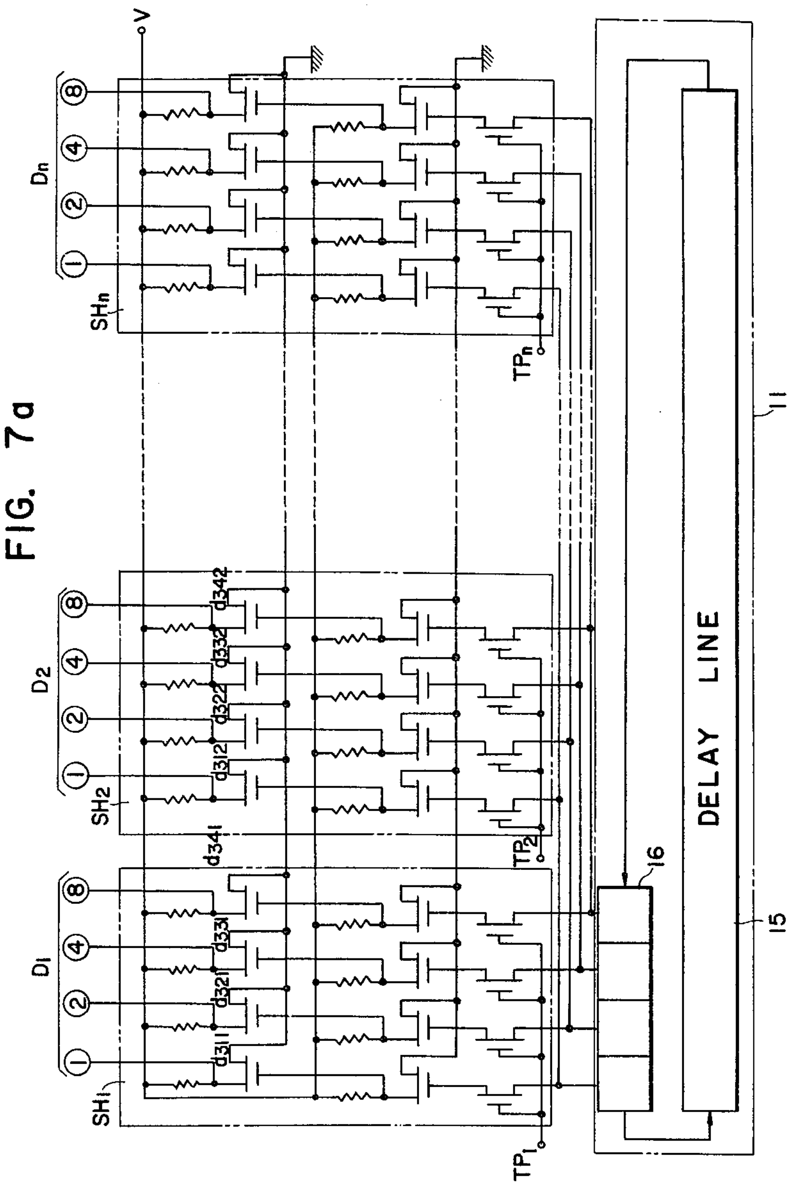
FIG. 7*a* and FIG. 7*b* are circuit diagrams of other embodiments of this invention.

FIG. 7*a* shows another embodiment of this invention, in which plural numbers of signal holding devices $SH_1$, $SH_2$, etc. are provided for holding a signal of four bits equivalent to binary-coded four bit signals corresponding to one decimal signal. Similar to the embodiment shown in FIG. 4, the signal holding devices $SH_1$, $SH_2$, etc. are connected in parallel to a four-bit dynamic shift register 16. Elements of the circuit shown in FIG. 7*a* are the same as those shown in FIGS. 4 and 5. Timing pulses $TP_1$ through $TP_n$ to be applied respectively to the signal holding devices are to act as a repeating pulse of circulating cycle of the memory content of each of said dynamic memories. Continuous memory contents $D_1$ through $D_n$ involved in the four-bit binary-coded signals for one decimal signal of said dynamic memory can be statically obtained as output signals in the memory order at each of the signal holding devices $SH_1$ through $SH_n$ inclusive, by providing the timing pulses delayed by four bits from one after another.

Figure 7B:
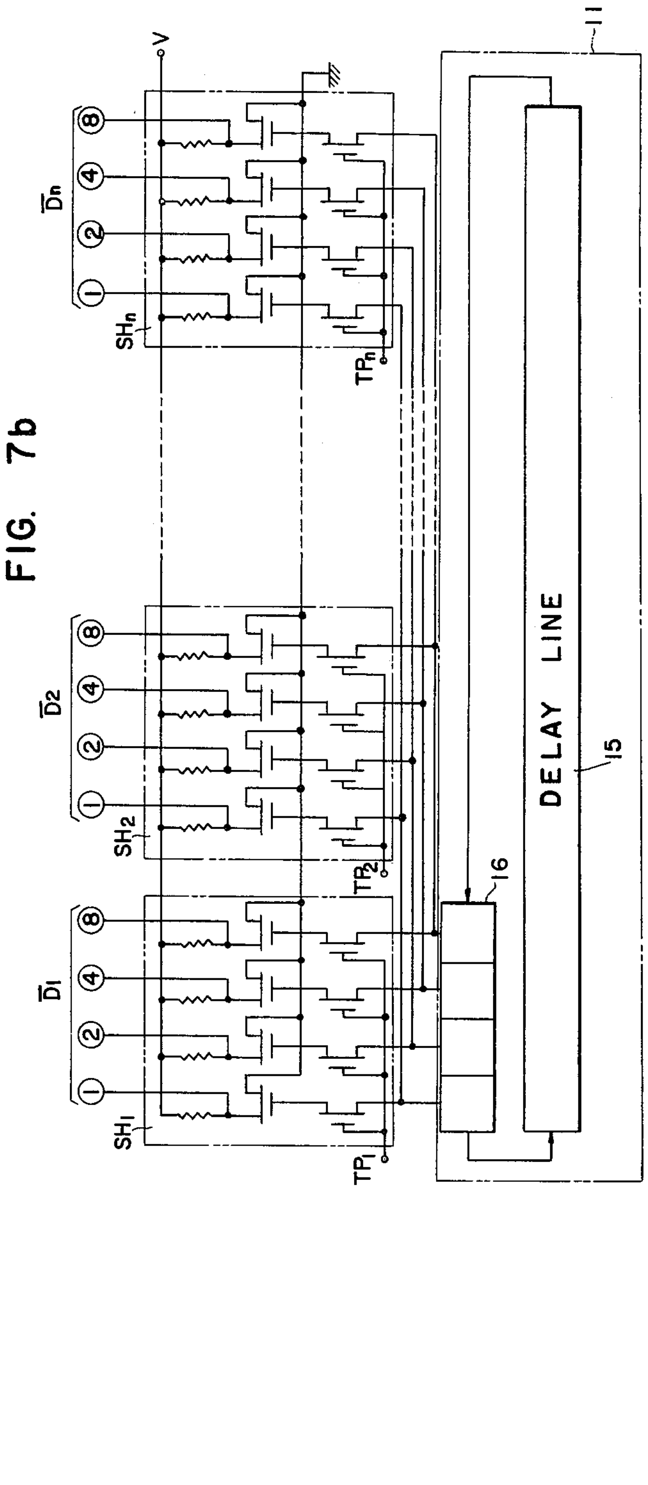

FIG. 7 (*b*) is a circuit diagram from which one inverter amplifier of the output side of each signal holding device shown in FIG. 7 (*a*) is omitted. Inverted output signals $D_1$ through $D_n$ inclusive of continuous memory contents $D_1$ through $D_n$ of the dynamic memory are obtained at the output end. It is obvious from the digital technology that modification of the logic processing of later stages can give normal effects even if the output signal is inverted. While, in the embodiments shown in FIGS. 4, 5, and 7, the four-bit dynamic shift register 16 and four-bit gate circuit and also four bit signal holding circuit are used to take out binary coded four bit signals corresponding to one decimal signal, it is believed obvious that said four bits may be substituted by N bits (where N represents an integer). A maximum number of bits is determined by the number of temporary memory circuits TM which are included in the dynamic memory 11. A specific memory content can be readout from the memory contents if at least one signal holding device is provided therein, and an adequate number of said signal holding devices may be used when necessary.

Figure 8:
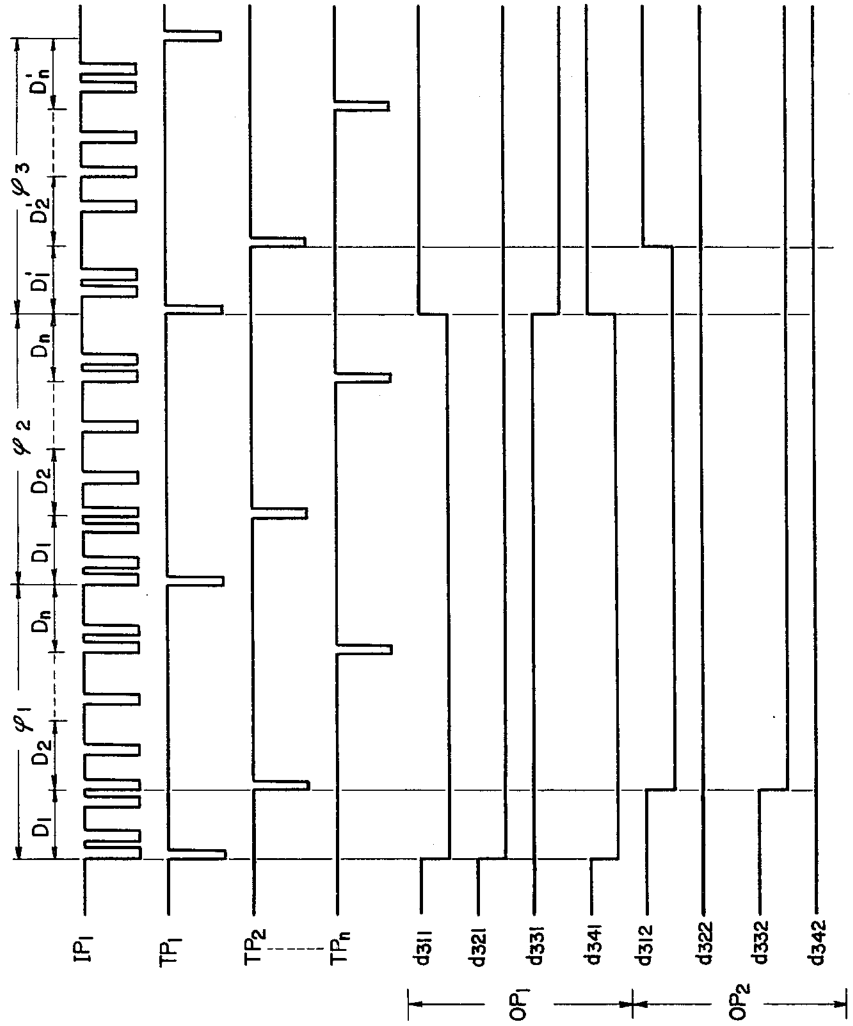
FIG. 8 is a series of waveforms showing the operation of the embodiments shown in FIGS. 7*a* and 7 *b*.

FIG. 8 is a waveform diagram showing the operation of the embodiment of FIG. 7a. When the memory contents $D_1$, $D_2$, . . . $D_n$ of the dynamic type shift register 16, which are to be sent to the input terminal of the signal holding device are not changed for the duration from the time $\phi_1$ to $\phi_2$ as shown in FIG. 8 (which correspond to circulation period $T_o$) and are changed as from the beginning of period $\phi_3$, said memory contents are gated by the timing pulse $TP_1$ and memory content $D_1$ is obtained in the form of $OP_1$ at the output terminal of the signal holding device $SH_1$, as shown in FIG. 8. Likewise other part of the memory contents are statically obtained by other timing pulses $TP_2$, $TP_n$.

In view of the foregoing, when the signal holding devices of this invention are applied to correspondence to all parts of the memory contents of the dynamic type shift register, said memory contents are always statically held and, in the period T immediately following the circulation period $T_o$ when the memory content is changed, the memory content of the static holding circuits is immediately changed. In addition, the signals thus held can be used as an operating signal or control signal.

As heretofore described, in the display system of the conventional static register, 14 or 15 FET's are needed per one bit if all the circuits are constituted by FET's and, consequently, it is difficult to use IC techniques in manufacturing the circuit. Whereas, in the signal holding device of this invention, 3 to 5 of FET's are sufficient for one bit, thus IC fabrication of the circuit can be easily realized. This at the same time means that the manufacturing cost and constructional size of said signal holding device can be reduced. Also, the present invention makes it possible to provide a higher speed shift register than the conventional static shift register. When such a high speed shift register of this invention is used in an electronic computer, computing time can be greatly reduced.

In the embodiments of this invention which heretofore have been described, not merely FET's but also other switching elements may be used for said gate circuit, but any other similar switching means may be utilized if such means are able to hold a stored digital signal until the next timing pulse comes in said gate circuit. Further, it is obvious that bistable circuits or the like in which multivibrators or Esaki diodes are employed, may be used instead of those utilizing discharging characteristics of capacitance elements.

The embodiments described above are to show an example in which a memory content of the dynamic memory is taken out in a sequential order so it is difficult to carry out truly high speed computation processing. Another embodiment will be described below by referring to FIG. 9, in which said disadvantageous point is removed.

Figure 9:
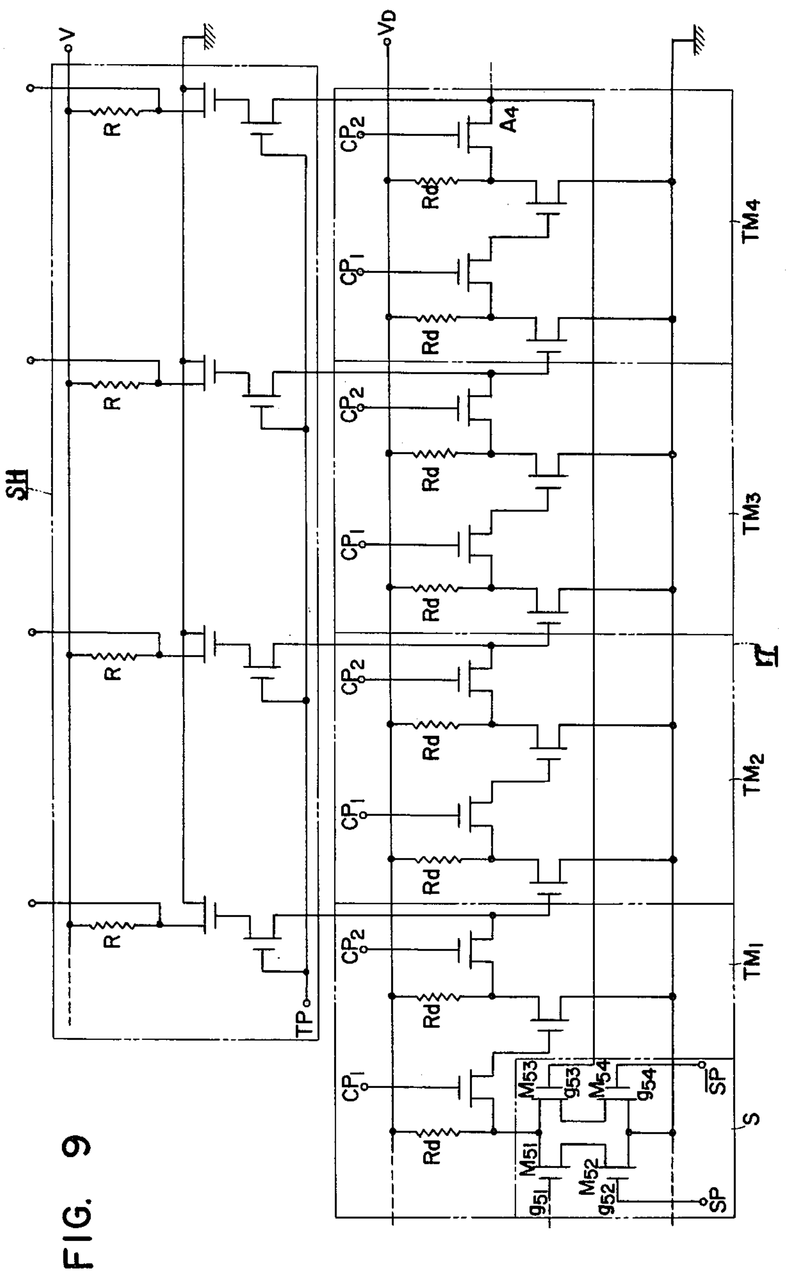
FIG. 9 is a partial circuit diagram showing another embodiment of this invention.

FIG. 9 shows a shift register for four bit binary-coded signals which represent one decimal signal in which a dynamic memory 11 is composed by cascade connection 17 of plural numbers of unit delay circuits composed of, temporary memory circuits $TM_1$, $TM_2$, $TM_3$, . . ., such as the temporary memory circuits TM shown in FIG. 2. Switching circuits S comprising FET-$M_{51}$ through FET-$M_{54}$ inclusive are connected respectively between the neighboring unit delay circuits 17 of four bits. The switching circuits S are controlled by a shift pulse SP and its inverted shift pulse SP. By this arrangement, a binary-coded decimal signal is shifted one by one when the switching circuits S connect the unit delay circuits in series with each other, or is circulated in the respective unit delay circuits when the switching circuits S divide the unit circuits from each other.

The shift pulse SP and its inverted shift pulse SP are applied to the gate terminals $g_{52}$ and $g_{54}$ of FET-$M_{52}$ and FET-$M_{54}$ whereby either one of said FET-$M_{52}$ or FET-$M_{54}$ is made conductive. FET-$M_{51}$ and FET-$M_{53}$ are connected in series to FET-$M_{52}$ and FET-$M_{54}$ respectively, and an input signal is applied to the gate terminal $g_{51}$ of FET-$M_{51}$. Further, under control of switching circuit S, a signal can be delayed by the delay circuit comprising temporary memory circuits $TM_1$ through $TM_4$ inclusive, for a duration of time required to shift 4 bits, and is fed back to the gate terminal $g_{53}$ of FET-$M_{53}$.

When the shift pulse SP is inverted by the signal "1" and the inverse shift pulse SP is in the state of signal "0", FET-$M_{52}$ becomes conductive and FET-$M_{54}$ becomes non-conductive. As a result, said FET-$M_{53}$ connected in series to said FET-$M_{54}$ is disconnected from the earth and, consequently, a feedback circuit provided via the gate terminal $g_{53}$ is cut off. Therefore an input signal will be applied to the temporary memory circuit $TM_1$ via the gate terminal $g_{51}$ of FET-$M_{51}$. Said input signal is then shifted by clock pulses $CP_1$ and $CP_2$ and the circuit operated as a shift register as shown in FIG. 4. At this time, upon the shift pulse SP and inverted shift pulse SP being changed respectively to the signal "0" and "1", FET-$M_{52}$ becomes non-conductive and FET-$M_{54}$ becomes conductive. Therefore the input signal being applied to the gate terminal $g_{51}$ of FET-$M_{51}$ is cut off, and a feedback circuit to be linked with the temporary memory circuit $TM_1$ from the output terminal $A_4$ of the temporary memory circuit $TM_4$ via the gate terminal $g_{53}$ of FET-$M_{53}$ is established whereby a binary signal of four bits of circulated and held therein.

As explained, the switching circuit S is operated to select one of the two signals and to convey it. It is obvious that this embodiment is not confined to the circuit comprising FET-$M_{51}$ through FET-$M_{54}$ inclusive, as in FIG. 9, but other switching circuits may be utilized in place of said circuit. Generally, these switching circuits $S_1$, $S_2$, . . . can be associated with each delay circuit having an optional delay time. The embodiment shown in FIG. 9 is only an example in which a switching circuit is placed in the input end of the four-bit delay circuit. It is to be noted that said delay circuit is not confined to a dynamic shift register as in FIG. 2, but, instead, other dynamic shift registers or other delay circuits using delay lines may be utilized.

The embodiment of FIG. 9 is to disclose that a gate circuit to be controlled by a timing pulse TP can be provided for each of the temporary memory circuits $TM_1$, $TM_2$, $TM_3$, . . . . of a delay circuit of a dynamic memory constituted in the manner as described above, and, via said gate circuit, a circulating memory content can be established for the signal holding circuits whereby the memory content can be statically held. Circuit elements indicated in FIG. 9 are the same as those shown in FIGS. 2, 4, 5 and 7. The repeating cycle of the timing pulse TP is fixed to either a delay time of four bits which is the circulating cycle of the feedback circuit formed by the switching circuit S, or the circulating cycle of the dynamic memory. In this embodiment, load resistance elements R and $R_d$ are employed. However, suitably biased FET's may be used instead of said resistance elements and thereby facilitate incorporation of IC manufacturing methods into this circuit.

We claim:

1. A dynamic memory system comprising recirculatory delay circuit means for continuously circulating at least N bit signals representative of data to be stored and read out, at least N read-out stations coupled to and comprising a part of said recirculatory delay circuit means where N is the minimum number of bits in a coherent character to be stored and read out and is an integer, at least N gating circuit means coupled to said read-out stations, there being at least one gating circuit means for each read-out station, at least N signal holding circuit means coupled to said gating circuit means for holding data at least one recirculation period of the recirculatory delay circuit means, there being at least one signal holding circuit means for each of said gating circuit means, and means for applying a periodic gating signal to all of said N gating circuit means simultaneously for reading out the bits of information stored therein into the signal holding circuit means for display or other processing, said periodic gating signal having a period T synchronized to the recirculation period $T_o$ to the date signals being recirculated in the recirculatory delay circuit means.

2. A dynamic memory system according to claim 1, further including means for reading data into the recirculatory delay circuit means.

3. A dynamic memory system according to claim 1, wherein there are a plurality of groups of N gating circuit means and their associated holding circuit means and means for applying a periodic gating signal thereto and wherein the periodic gating signal applied to each group of N gating circuit means is shifted in phase relative to the periodic gating signal applied to an adjacent group of N gating circuit means by an amount equal to N bits of data.

4. A dynamic memory system comprising recirculatory delay circuit means for continuously circulating at least N bit signals representative of data to be stored and read out, at least N read-out stations coupled to and comprising a part of said recirculatory delay circuit means where N is the minimum number of bits in a coherent character to be stored and read out and is an integer, at least N gating circuit means coupled to said read-out stations, there being at least one gating circuit means for each read-out station, at least N signal holding circuit means coupled to said gating circuit means, there being at least one signal holding circuit means for each of said gating circuit means, and means for applying a periodic gating signal to all of said N gating circuit means simultaneously for reading out the bits of information stored therein into the signal holding circuit means for display or other processing, said periodic gating signal having a period T synchronized to the recirculation period $T_o$ of the data signals being recirculated in the recirculatory delay circuit means, wherein the N read-out stations are connected in a cascade arrangement and the memory further includes, feedback circuit means coupled between an output terminal of the Nth read-out station and an input of the first read-out station, switching circuit means coupled to the first read-out station for switching the input thereof between the feedback circuit means and an input source of data bits to be registered, and means for selectively applying switching signals to said switching circuit means for selectively operating the same.

5. A dynamic memory system comprising recirculatory delay circuit means for continuously circulating at least N bit signals representative of data to be stored and read out, at least N read-out stations coupled to and comprising a part of said recirculatory delay circuit means where N is the minimum number of bits in a coherent character to be stored and read out and is an integer, at least N gating circuit means coupled to said read-out stations, there being at least one gating circuit means for each read-out station, at least N signal holding circuit means coupled to said gating circuit means, there being at least one signal holding circuit means for each of said gating circuit means, and means for applying a periodic gating signal of all of said N gating circuit means simultaneously for reading out the bits of information stored therein into the signal holding circuit means for display or other processing, said periodic gating signal having a period T synchronized to the recirculation period $T_o$ of the data signals being recirculated in the recirculatory delay circuit means, wherein each of said holding circuit means comprises an amplifying insulated gate field effect transistor and a storage capacitance means and wherein said storage capacitance means is comprised by the interelectrode capacitance of the insulated gate field effect transistor comprising the holding circuit means.

6. A dynamic memory system according to claim 5, wherein the N read-out stations are connected in a cascade arrangement and the register further includes feedback circuit means coupled between an output terminal of the Nth read-out station and an input of the first read-out station, switching circuit means coupled to the first read-out station for switching the input thereof between the feedback circuit means and an input source of data bits to be registered, and means for selectively applying switching signals to said switching circuit means for selectively operating the same.

7. A dynamic memory system according to claim 5, wherein the holding circuit means further includes inverting amplifying means connected to the output of the amplifying means for providing a desired polarity amplified read-out signal.

8. A dynamic memory system according to claim 7, wherein there are a multiplicity of groups of N gating circuit means and their associated holding circuit means and means for applying a periodic gating signal thereto and wherein the periodic gating signal applied to each group of N gating circuit means is shifted in phase relative to the periodic gating signal applied to an adjacent group of N gating circuit means by an amount equal to N bits of data.

9. A dynamic memory system comprising:

a dynamic type recirculatory shift register for circulating binary signals therein which comprises a plurality of read-out stations for reading out one binary signal of plural bits;

a plurality of gating circuit means equal in number to said read-out stations, each of said gating circuit means being coupled to a respective one of said read-out stations;

means for applying a periodic gating signal to said gating circuit means in order to read out said one binary signal appearing at said read-out stations and transfer said plural bits therethrough in parallel; and a plurality of signal holding circuit means equal in number to said gating circuit means and each being coupled to a respective one of said gating circuit means for holding one binary signal transferred through the gating circuit means for at least the interval period of said gating signal.

10. A dynamic memory system according to claim 9, wherein each of said gating circuit means comprises a first insulated gate-type field effect transistor having a source electrode and a drain electrode, one of which is connected to the corresponding read-out station, and an insulated gate electrode connected to said gating signal applying means, and wherein each of said signal holding circuit means comprises a second insulated gate-type field effect transistor having a source electrode, a drain electrode and an insulated gate electrode, and means for applying an output signal from the other one of the source and drain electrodes of the first transistor of the corresponding gating circuit means between the insulated gate electrode and one of the source and drain electrodes of the second transistor.

11. A dynamic memory system comprising:

a dynamic type recirculatory shift register for circulating plural-bit binary signals therein, said shift register including a plurality of read-out stations equal in number to the bits of one binary signal for reading out a binary signal of plural bits;

a plurality of gating circuit means equal in number to the bits of one binary signal, gating circuit means being coupled to a respective one of said read-out stations;

means for applying simultaneously to said gating circuit means periodic gating pulses with intervals equal to a period corresponding to the number of the bits of one binary signal so as to momentarily render said gating circuit means conductive, whereby one binary signal appearing at the respective read-out stations is parallelly transferred through the respective gating circuit means; and at least one set of signal holding circuit means equal in number to said gating circuit means coupled to said gating circuit means for holding the binary signal transferred through the gating circuit means for at least one interval period of said gating pulses, there being a respective signal holding circuit means for each of said gating circuit means in each set of the signal holding circuit means, whereby data stored in said memory system is read out and held at least for the repeating period of the gating pulses thus enabling display and other processing.

12. A dynamic memory system according to claim 11, wherein each of said gating circuit means comprises a first insulated gate-type field effect transistor having a source electrode and a drain electrode, one of which is connected to the corresponding read-out station, and an insulated gate electrode connected to said gating pulse applying means, and wherein each of said signal holding circuit means comprises a second insulated gate-type field effect transistor having a source electrode, a drain electrode and an insulated gate electrode, and means for applying an output signal from the other one of the source and drain electrodes of the first transistor of the corresponding gating circuit means between the insulated gate electrode and one of the source and drain electrodes of the second transistor.

13. A dynamic memory system for storing and reading out binary-coded decimal signals of plural bits representative of data to be stored and read out comprising:

recirculatory delay circuit means for circulating at least one binary-coded decimal signal of plural bits, said recirculatory delay circuit means including at least one set of cascade connected temporary memory circuits equal in number to the bits of one binary-coded decimal signal, each said temporary memory circuit providing a delay of one bit and having an output terminal at which one respective bit of said one binary-coded decimal signal appears periodically;

a plurality of gating circuit means equal in number to the bits of said one binary-coded decimal signal, each gating circuit means being connected to the output terminal of a respective temporary memory circuit for operatively transferring therethrough output signals appearing at the output terminals of the corresponding temporary memory circuits in parallel;

means for applying simultaneously to the respective gating circuit means periodic gating pulses with intervals equal to the delay period of said cascade connected temporary memory circuits so as to momentarily render said gating circuit means conductive; and at least one set of signal holding circuit means equal in number to the bits of one binary-coded decimal signal coupled to said gating circuit means for holding the signals transferred through the gating circuit means for at least the repeating period of the gating pulses, there being one signal holding circuit means for each of said gating circuit means in each set of the signal holding circuit means, whereby data stored in said memory system is read out and held at least for the repeating period of the gating pulses thus enabling display and other processing.

14. A dynamic memory system according to claim 13, wherein each of said gating circuit means comprises a first insulated gate-type field effect transistor having a source electrode and a drain electrode, one of which is connected to the output terminal of the corresponding temporary circuit, and an insulated gate electrode connected to said gating pulse applying means, and wherein each of said signal holding circuit means comprises a second insulated gate-type effect transistor having a source electrode, a drain electrode and an insulated gate electrode, and means for applying an output signal from the other one of the source and drain electrodes of the first transistor of the corresponding gating circuit means between the insulated gate electrode and one of the source and drain electrodes of the second transistor.

15. A dynamic memory system according to claim 13, wherein said recirculatory delay circuit means comprises a dynamic delay device including said one set of cascade connected temporary memory circuits and means for forming said dynamic delay device into a recirculatory circuit in which at least one binary-coded decimal signal is dynamically circulated.

16. A dynamic memory system comprising:

a delay circuit having input and output terminals;

a switching circuit comprising first and second series circuits, which circuits are connected in parallel together to form a parallel circuit and each of which includes at least two serially connected insulated gate-type field effect transistors;

means including a common load connected at one end thereof in series with said parallel circuit for supplying a voltage to said parallel circuit through said common load;

means for applying an input signal to an insulated gate electrode of one of the two serially connected field effect transistors of one of the first and second series circuits;

means for applying a first shift pulse signal to an insulated gate electrode of the other one of the two serially connected field effect transistors of said one of the first and second series circuits;

means for applying a second shift pulse signal which is an inverted signal of the first shift pulse to an insulated gate electrode of one of the serially connected two field effect transistors of the other one of the first and second series circuits;

means for connecting the output terminal of the delay circuit to an insulated gate electrode of the other one of the two serially connected field effect transistors of the other one of the first and second series circuits; and means for connecting the junction point between the common load and the parallel circuit to the input terminal of the delay circuit.

17. A combination comprising a first shift register having a first input and output terminal therefor in which stored binary signals are successively shifted, a second shift register having a second input and output terminal therefor, said second shift register comprising cascadely connected plurality of unit circuits, each unit circuit comprising a first plurality of insulated gate-type field effect semiconductor devices, means for electrically connecting said first output terminal of said first shift register to said second input terminal of said second shift register, means for electrically connecting said second output terminal of said second shift register to said first input terminal of said first shift register so that said binary signals are shifted and circulated in said first and second shift registers, a second plurality of insulated gate-type field effect semiconductor devices, each of said second semiconductor devices having an insulated gate electrode and a pair of electrode terminals, one of said pair of electrode terminals being connected to one of said unit circuits in said second shift register, and means for impressing a syncronizing pulse signal to said insulated gate electrodes of said second semiconductor devices, and a plurality of signal holding circuit means connected respectively to said second semiconductor devices for holding the binary signals transferred thereto for at least the interval period of the synchronizing pulse signal.

18. The combination comprising:

a. an N bit shift register for temporarily storing N bit binary signals therein, the number of N being not less than four, comprising a first N-4 bit shift register for temporarily storing N-4 bit binary signals therein, said first shift register having an input terminal and an output terminal, and a second four bit shift register for temporarily storing four bit binary signals therein, said second shift register comprising first, second, third and fourth unit circuits, each unit circuit comprising first, second, third and fourth insulated gate-type field effect transistors, each transistor having a first control terminal and first and second output terminals, means connecting said second output terminal of said first transistor with said first output terminal of said second transistor, means connecting said second output terminal of said second transistor with said first control terminal of said third transistor, means connecting said second output terminal of said third transistor with said first output terminal of said fourth transistor, and means maintaining the potential of said first output terminals of said first and third transistors to a reference potential, means connecting the first control terminals of the first transistors in said second, third and fourth units circuits with the second output terminals of the fourth transistors in said first, second and third unit circuits, respectively, means supplying a first clock pulse signal to the first control terminal of the second transistor of each of said unit circuits, means supplying a second clock pulse signal to the first control terminal of the fourth transistor in each of said unit circuits, said second clock pulse signal being out of time phase with said first clock pulse signal and having the same cyclic period as said first clock pulse, a first voltage supply source, load impedance means respectively connected between said first voltage supply source and the second output terminals of the first and third transistors in each of said unit circuits, means connecting said first control terminal of said first transistor in said first unit circuit constructing said second shift register with said output terminal of said first shift register and means coupling said second output terminal of said fourth transistor in said fourth unit circuit constructing said second shift register to said input terminal of said first shift register; and b. a gate circuit comprising fifth, sixth, seventh and eighth insulated gate-type field effect transistors, each transistor having a second control terminal and third and fourth output terminals, means coupling the third output terminals of said fifth, sixth, seventh and eighth transistors with said first, second, third and fourth unit circuits, respectively, and means supplying a timing pulse signal to said second control terminals of said fifth, sixth, seventh and eighth transistors, said timing pulse signal being in synchronism with said first clock pulse signal.

19. The combination defined in claim 18, wherein said load impedance means in said second shift register comprises insulated gate-type field effect transistors each having an insulated gate, source and drain electrodes, said insulated gate electrode being connected with said drain electrode.

20. The combination defined in claim 18, wherein said means coupling the third output terminals of said fifth, sixth, seventh and eighth transistors with said first, second, third and fourth unit circuits comprises means connecting said third output terminals with said second output terminals of said fourth transistors in said first, second, third and fourth unit circuits, respectively.

* * * * *